Patented Aug. 2, 1927.

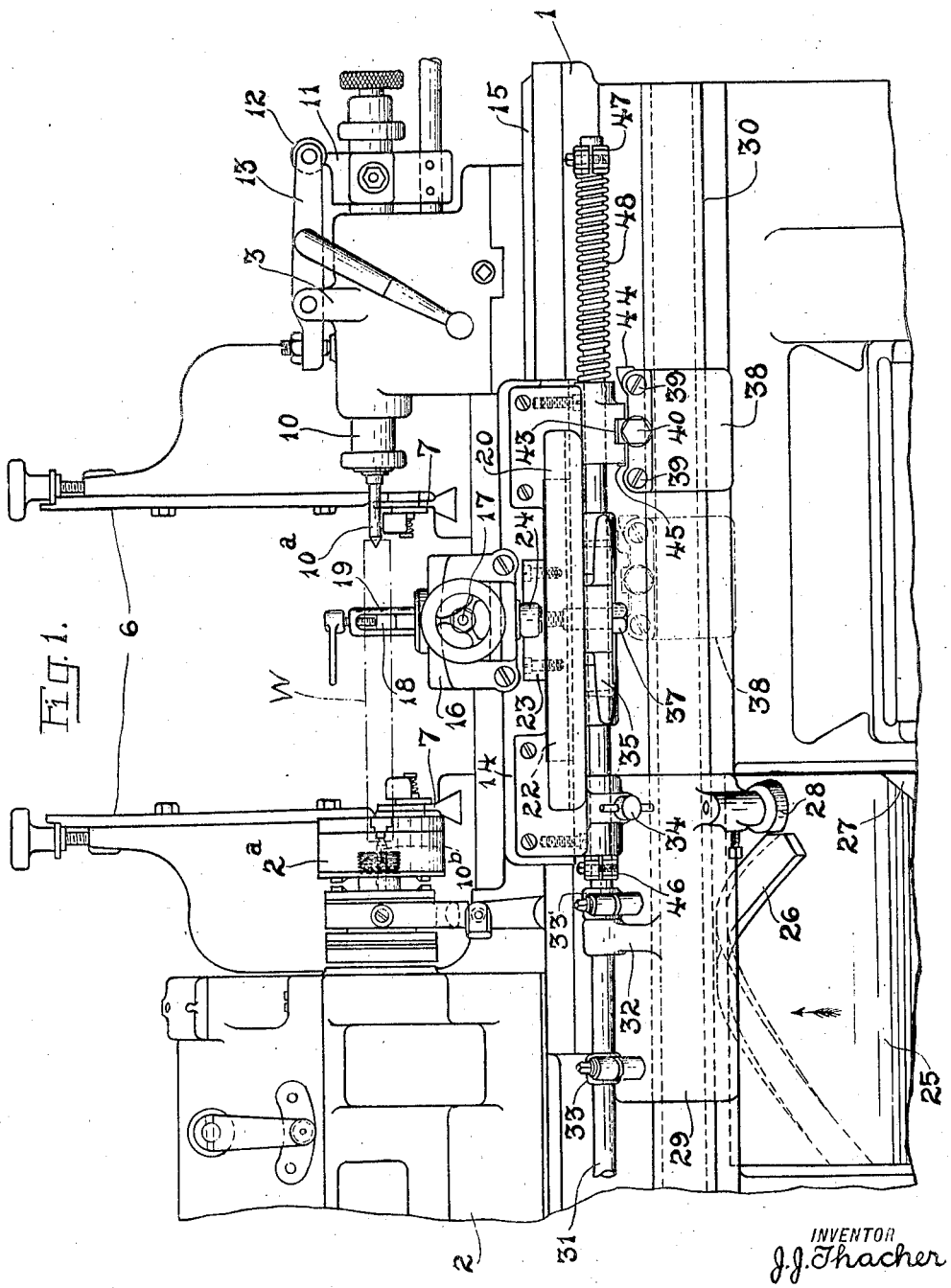

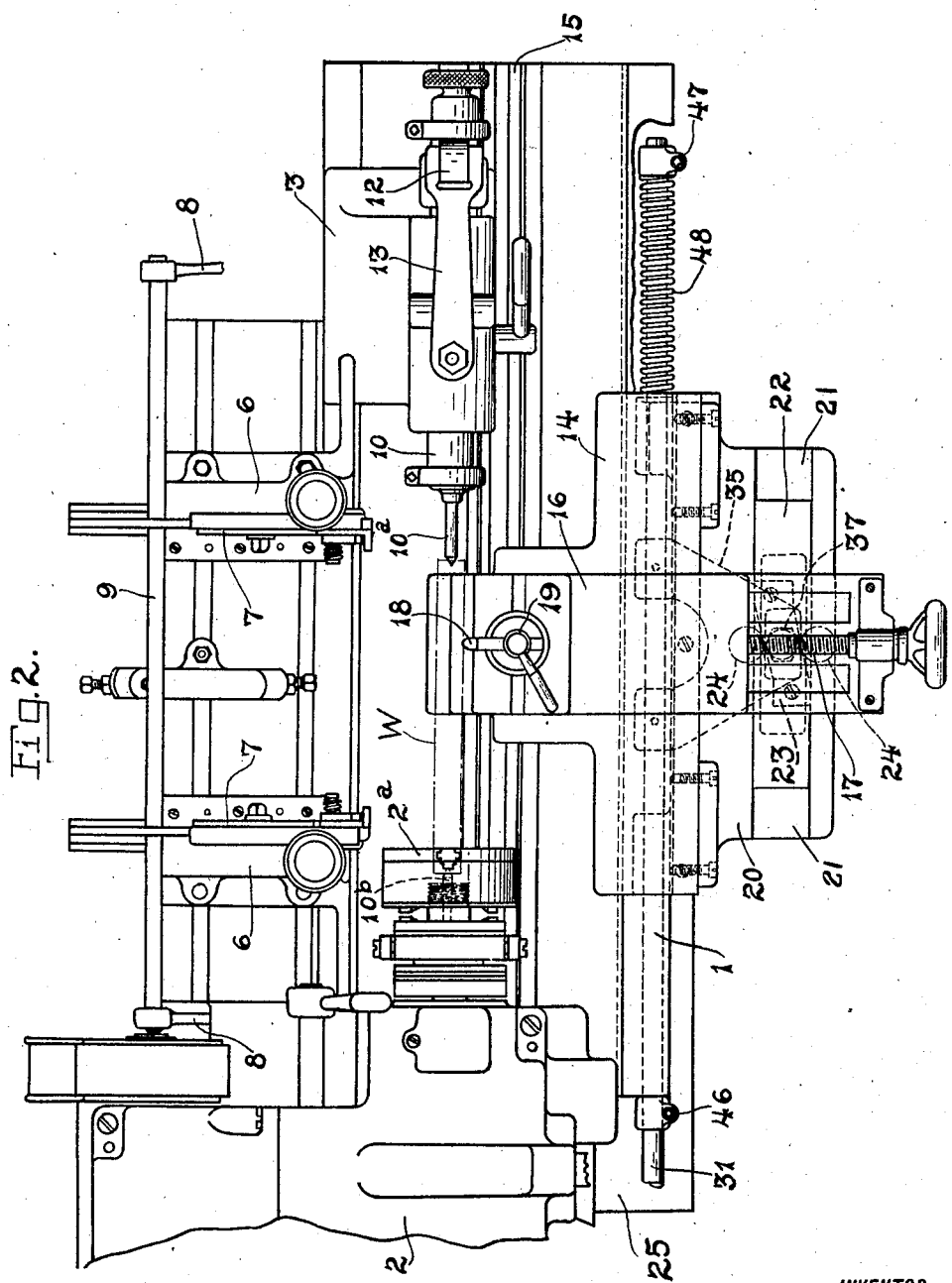

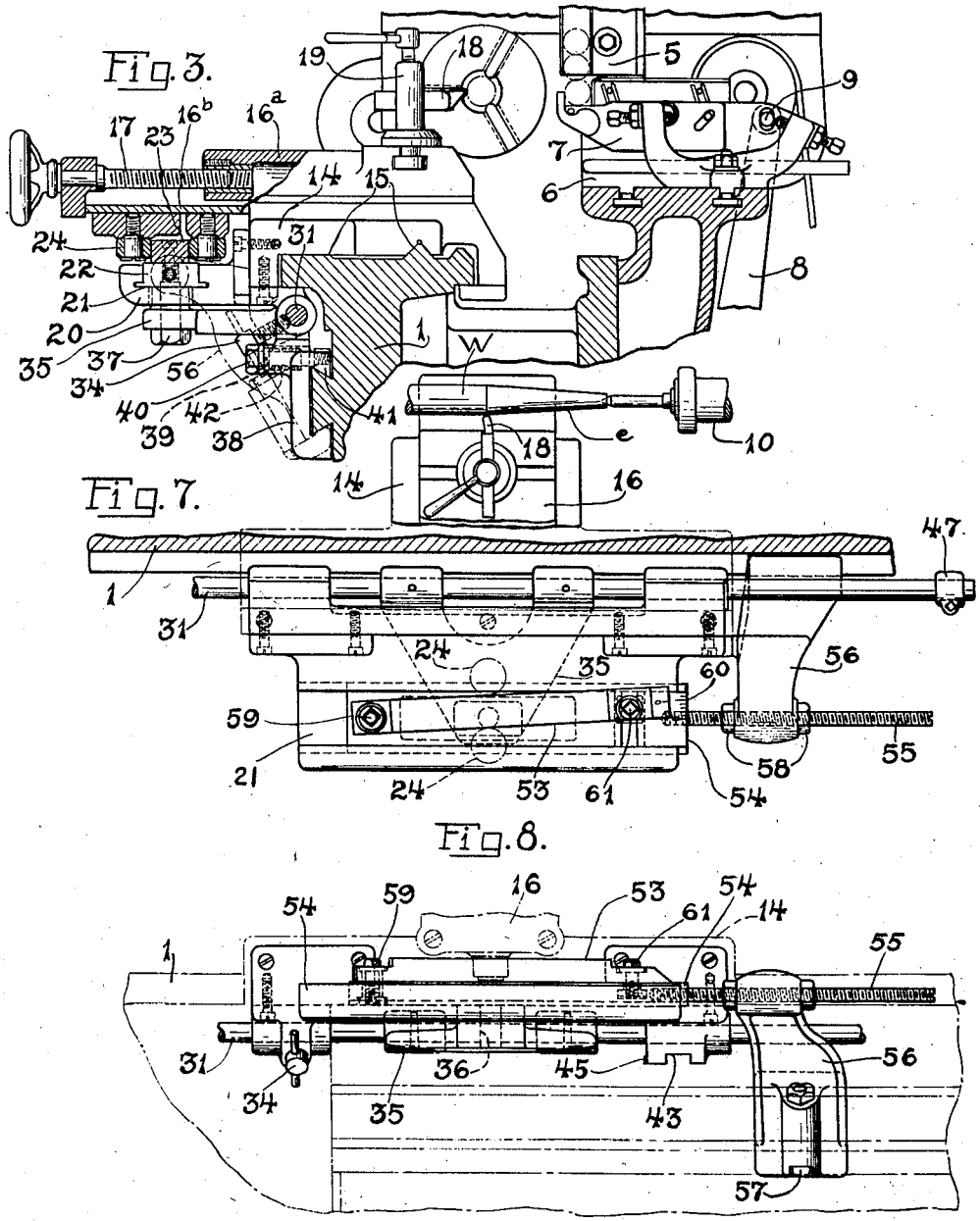

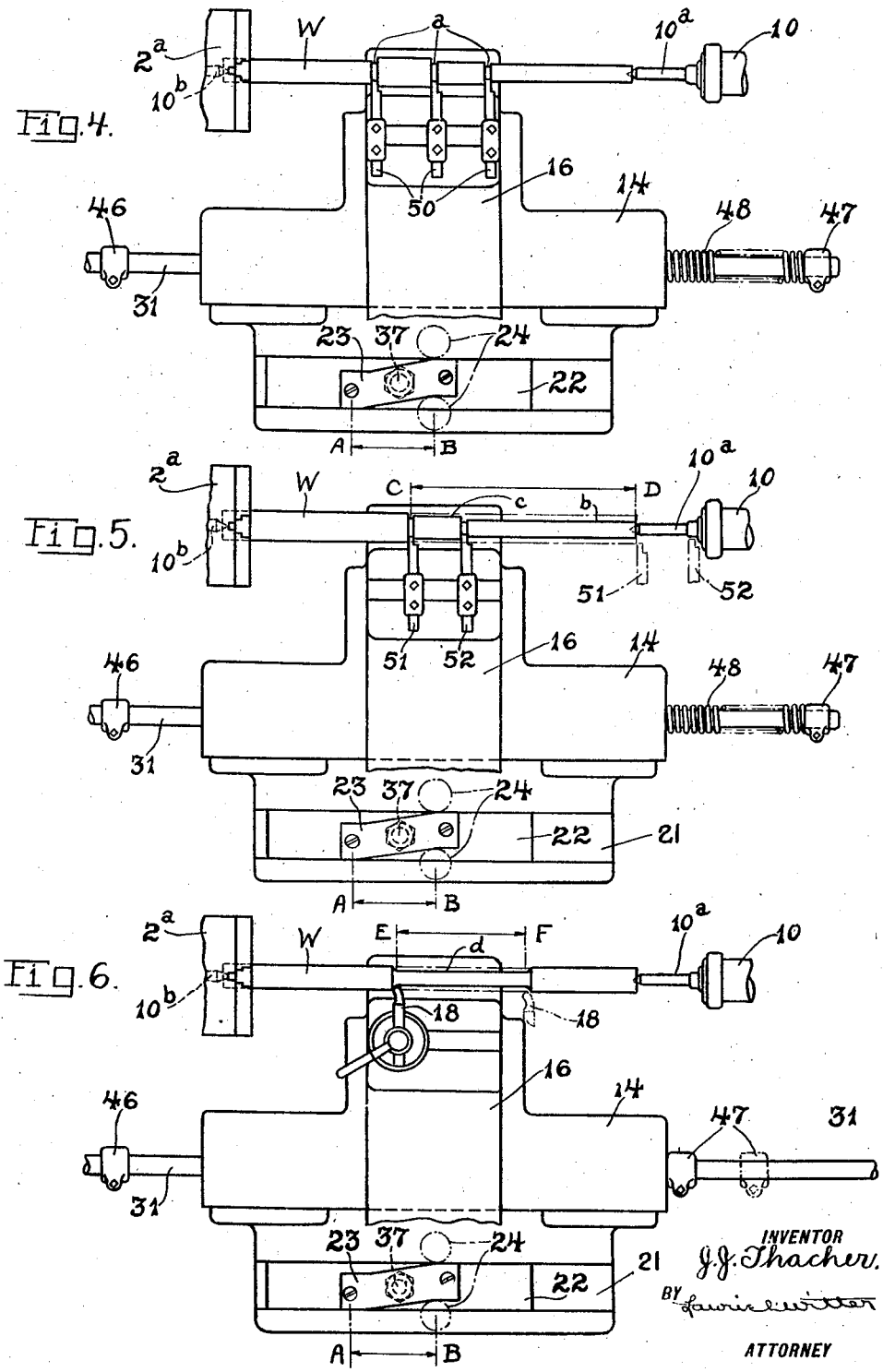

1,637,792

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

AUTOMATIC LATHE.

Application filed January 17, 1924. Serial No. 686,859.

This invention relates to automatic lathes and particularly to the tool controlling and operating mechanism thereof, such as that shown in patent to S. Jay Teller, No. 1,521,340 granted December 30, 1924. The lathe illustrated in the accompanying drawings is provided with a tool carriage and a tool slide on the carriage. The various operations to be performed by the lathe require mechanism for automatically operating and controlling these members in various combinations of relative and unitary movements. The primary object of the invention is to provide an improved mechanism for automatically producing such movements.

Another object of the invention is to provide a templet for moving the tool slide and means including a single rod connected to the templet and to the carriage and operating on such members to give the slide and carriage such movements relative to the work as will automatically perform the desired turning operations.

In performing necking operations, in combination with turning operations or otherwise, the tool slide is moved forwardly to force the tool or tools into the work. At the completion of the operation, the work piece is released and allowed to drop. It is essential that the tools should be withdrawn from the work before the same is dropped, otherwise the tools are very likely to be broken. It is another object of the invention to provide means for quickly and automatically withdrawing the tools from the work at the completion of the necking operation.

With the above and other objects in view, my invention consists in the features of construction and operation set forth in the following specification and illustrated in the accompanying drawings. In such drawings annexed hereto and forming a part of this specification, I have illustrated certain embodiments of my invention in connection with an automatic lathe but it will be understood that the invention can be otherwise embodied and that the drawings are not to be construed as defining or limiting the scope of the invention, the claims appended to this specification being relied upon for that purpose.

Referring to the figures of the drawings:

Figure 1 is a partial front elevation of an automatic lathe showing the present invention embodied therein.

Fig. 2 is a plan view thereof.

Fig. 3 is a vertical transverse sectional view through the same.

Fig. 4 is a fragmentary plan view showing the mechanism as automatically performing a necking operation on a work piece.

Fig. 5 is a like view showing the mechanism as automatically performing a combined turning and necking operation on a work piece.

Fig. 6 is a like view showing the mechanism as automatically performing another turning operation on a work piece.

Fig. 7 is a fragmentary plan view showing the mechanism for taper turning a work piece.

Fig. 8 is a fragmentary front elevation of Fig. 7.

In its entirety, my invention comprises an automatic machine of the lathe type in which the piece or blank to be operated upon is held between live and dead centers and is rotated by means of a driving chuck. Generally, the machine comprises a bed which has mounted thereon at one end a headstock and at the other end a tailstock, the tailstock being operated by a suitable cam so as to engage the blank worked upon at a predetermined pressure and serving to clamp the dead or tailstock center securely in place to hold the blank on the centers. At the rear of the bed of the machine a suitable magazine is provided for holding a number of blanks or pieces preparatory to being worked upon and also means for transferring or carrying one of the blanks from its position at the lower end of the magazine to its operative position between the centers of the lathe.

In automatic lathes, the movements of the tool or tools must be definitely and automatically controlled in a manner to cut the work to the desired configuration. Such operations require accurate feeding movements of the tool carriage along the bed and of the tool slide on the carriage transversely of the bed, such movements necessarily being accurately timed one relative to the other. Improved and automatically acting means are illustrated in the accompanying drawings for giving the carriage and slide such movements and combinations of movements to perform various kinds of work.

Referring more specifically to the drawings by reference characters, the bed 1 of the lathe supports a headstock 2 on one end and a tailstock 3 on its other end. A piece of work W is illustrated as rotatably supported between the tailstock and headstock centers and as rotated by a chuck 2ª, in the headstock. The work is adapted to be fed to the machine from a magazine 5. The magazine preferably comprises a pair of blank supporting uprights 6 longitudinally adjustable along the bed 1 to support blanks of different lengths. A pair of blank carriers 7 are adapted to slide beneath the magazine to carry a blank from the magazine to the work supporting centers, levers 8 connected to the carriage through a rod 9 and operated from a suitable cam being provided for performing this function. The tailstock is adapted to be operated automatically in synchronism with the operation of the magazine mechanism. The sleeve 10 of the tailstock is fed forward to engage the center 10ª with the work at the proper time and the movement of the cam member 11 under the roller 12 operates the lever 13 to automatically clamp the sleeve and the center against the work, such mechanism being fully described in Patent No. 1,252,928. These mechanisms within themselves comprise no part of the present invention and therefore will not be further described herein, it being understood, however, that the present invention now to be fully described is adapted to be operated automatically in combination and in synchronism with the said mechanisms.

A tool carriage 14 is slidably mounted on the ways 15 of the bed 1 and a tool slide 16 is transversely slidable on the carriage. The upper portion 16ª of the slide is transversely adjustable on the lower portion 16ᵇ thereof by means of a screw 17. A tool 18 is illustrated as clamped in the tool post 19 of the upper portion 16ª of the slide. A bracket 20 bolted to the front side of the carriage is provided with a longitudinally extending guideway 21 therein for receiving a templet supporting slide 22. The slide 22 is adapted to support a templet bar 23 thereon as illustrated in Figs. 4, 5 and 6. A pair of rollers 24 carried on studs threaded into the lower portion 16ᵇ of the slide 16 engage against opposite sides of the bar 23.

The tool supports are operated from a cam drum 25 on which are two spirally arranged cam strips 26 and 27. These strips are adapted to operate against a roller 28 on a member 29 slidably mounted on a guideway 30 on the front face of the bed 1. Rotation of the drum in the direction of the arrow (Fig. 1) is adapted to reciprocate the member 29 on the guideway 30. A connecting rod 31 extends loosely through bearings in the carriage 14 and through a lug 32 on the member 29. A pair of collars 33 and 33' adjustably mounted on the rod 31 are adapted to be engaged by the lug 32 and the carriage can be secured to the rod by means of a clamping screw 34.

Secured to the rod 31 within the carriage 14 is a yoke-shaped forwardly extending member 35. The portion of this member beneath the slide 22 is provided therein with a bolt receiving hole 36. In Figs. 1 to 6, a bolt 37 extending upwardly through this hole is screw threaded into the slide 22 whereby to rigidly connect the member 35 and slide 22. As so connected, the slide 22 is adapted to move with the rod 31.

A block 38 is slidably mounted on the guideway 30 and is normally frictionally secured against movement thereon by means of a pair of screws 39 extending through compression springs 40 and threaded into a gib 41. As shown in Fig. 3, each spring engages the head of its screw 39 and resiliently exerts an outward force thereon and on the gib, the gib thereby being frictionally held in contact with the guideway 30. The block can be positively secured to the guideway by means of a bolt 40 screw threaded into the gib. The construction is such that when the bolt 40 is tightened, the block is positively secured against movement and when the bolt 40 is loosened, the block remains frictionally secured to the guideway 30 through the action of the screws 39 and springs 42. To positively secure the block to the guideway therefore, it is only necessary to tighten the bolt 40. A lug on the block is adapted to engage a cooperating notch 43 in the carriage as shown in Fig. 1 whereby to secure the carriage thereto. The block is also provided with a stop 44 to be engaged by a stop 45 on the carriage when the block is adjusted to another position, as that shown in dot and dash lines in Fig. 1.

Collars 46 and 47 are adjustably mounted on the rod 31 respectively at opposite sides of the carriage 22 and are adapted to operate against the carriage to move the same on its ways. As shown in Figs. 1, 2, 4 and 5, a compression spring 48 is interposed between the collar 47 and the carriage 22. The function of this spring and the various other adjustable mechanisms and connections will be apparent from the following description of the operation performed by the machine.

In Fig. 4, I have illustrated the mechanism arranged to turn three grooves a in the work piece W. Such an operation is ordinarily termed "necking." Three tools 50 are mounted on the tool slide 16. For this operation, the tool carriage 14 is positively secured to the bed through the block 38 and bolt 40 in the manner illustrated in Fig. 1 and heretofore described. The collars 33 and 33' are so spaced that the lug 32 moves the rod 31 through a distance (A—B). Upon rotation of the cam drum 25, the cam strip 27 moves the member 29 to the left, which member moves the rod 31 therewith when the lug 32 engages the collar 33. This movement of the rod and templet 23 forces the tool slide 16 inwardly to perform the necking operation. Such movement of the rod compresses the spring 48, which quickly and automatically reacts to move the rod and templet in the opposite direction when the roller 28 leaves the cam strip 27. Such reaction by the spring 48 quickly withdraws the tools from the work piece which is thereafter permitted to drop. The collar 46 limits the reacting movement of the rod.

It should be understood that all operations of the machine, including the operations just described are entirely automatic and operate in synchronism preferably from a single source of power. A blank is automatically fed from the magazine 5 to the chuck 2ª and centers 10ª and 10ᵇ. The tailstock is moved forward to engage the work between the centers and the tailstock is then clamped in such position. The chuck rotates the work while the same is automatically operated on by the tool or tools. The tailstock is thereafter released and withdrawn whereupon the work drops and another piece is brought forward and the operations repeated thereon. The mechanism for performing these functions is fully described in my Patent No. 1,507,265 granted September 2, 1924.

In Fig. 5, the mechanism is illustrated as arranged to perform a combined turning and necking operation. Two tools 51 and 52 are mounted on the tool slide. The block 38 is adjusted, as shown in dot-and-dash lines in Fig. 1, whereby the stop 45 on the carriage will engage the stop 44 after a predetermined movement of the carriage. The collars 33 and 33' are so spaced that the lug 32 moves the rod 31 through a distance (C—D)+(A—B.). Rotation of the cam drum 24 moves the rod to the left which carries the templet and carriage therewith as a unit. The portion (C—D) of the carriage movement operates to turn the portions b and c of the work piece. When the carriage stop 45 engages the stop 44, the carriage movement is arrested, the rod and templet continuing to move and compressing the spring 48. This movement (A—B) of the templet necks the work piece in the same manner heretofore described in reference to Fig. 4. When the collar 28 leaves the cam strip 27, the spring quickly reacts on the rod and templet to withdraw the tools as above described. The cam strip 26 thereafter operates through the rod 31 and collar 46 to quickly move the carriage back to its original position.

In Fig. 6 is illustrated a further turning operation. For this operation the block 38 is frictionally secured to the guideway 30. The collars 33 and 33' are so spaced that the lug 32 moves the rod 31 through a distance (A—B)+(E—F.) Initially, the parts are in the position illustrated in dot-and-dash lines at 18 and 47. Movement of the rod 31 to the left will first move the templet a distance (A—B) relative to the carriage, the carriage being frictionally secured to the bed. Such movement forces the tool to depth into the work piece. At the end of such movement the collar 47 engages the carriage whereupon the carriage and templet are moved as a unit through a distance (E—F). Such movement turns the portion d of the work piece. At the completion of such operation, the work is released and allowed to drop, as heretofore described, and the cam strip 27 forces the templet and carriage back to their original positions, the collar 46 acting against the carriage after the templet has been moved to the right relative to the carriage to withdraw the tool slide. Since at the completion of this operation the tool is not engaged in a groove or neck in the work piece, the quick withdrawing of the tool before dropping the work piece is unnecessary.

It should be understood that the three operations shown in Figs. 4, 5 and 6 and above described are illustrated only as examples of turning operations for which my improved mechanism is adapted. The mechanism is capable of automatically operating and controlling the tool carriage and tool slide whereby the same can be given various combinations of movements for performing various turning operations. These movements can be varied relative to the bed and relative to each other by adjusting the various stops, collars and other mechanism to different operating positions.

Taper turning operations can also be readily performed by making slight changes and adjustments in my improved mechanism. The parts illustrated in Figs. 7 and 8 are mostly those parts illustrated in Figs. 4, 5 and 6 and above described. A taper bar 53 is substituted for the templet bar 23 and is preferably mounted on a slide 54 longer than the slide 22. The rollers 24 engage the opposite sides of the bar 53 as illustrated. The bolt 37 being removed, the slide 54 is not secured to the member 35 and rod 31 as was the slide 22. The slide 54 is anchored against movement relative to the bed by means of a screw threaded rod 55 and a bracket 56. A hook-shaped bolt 57 adjustably secures the bracket by a pair of adjusting nuts 58. By properly adjusting the collars 33, 33', 46 and 47, the carriage can be moved on the bed to perform the required turning operation, the transverse movement of the tool slide of course depending upon the angular position of the bar 53 about the bolt 59. The bar 53 is adjustable about the bolt 59 as a center, an index 60 being adapted to indicate the amount of such adjustment. A clamping bolt 61 secures the bar in its adjusted position. As shown in Fig. 7, the taper $e$ turned on the work piece W corresponds to the angular adjustment of the taper bar 53.

What I claim is:

1. In a lathe, the combination of a bed having ways extending longitudinally therealong, means on the bed for supporting and rotating a blank parallel with the ways, a tool carriage slidably mounted on the ways, a tool slide movable transversely on the carriage, means for holding the carriage against movement on the ways, power means, and means to longitudinally move said carriage including a rod movable longitudinally of the bed and relatively to the carriage and a coiled compression spring thereon through which the power means acts to automatically move the tool slide inwardly to operatively engage the work when the carriage is stationary, the said spring reacting to automatically and quickly move the tool slide outwardly away from the work at the completion of the cutting operation.

2. In a lathe, the combination of a bed having ways extending longitudinally therealong, means on the bed for supporting and rotating a blank parallel with the ways, a tool carriage slidably mounted on the ways, a tool slide movable transversely on the carriage, means for holding the carriage against movement on the ways, means to move the carriage including a rod movable longitudinally relatively to the carriage, a templet and connections for moving the tool slide inwardly when the carriage is held stationary to operatively engage the work as the templet is moved in one direction, power means for so moving the templet variable distances, and means automatically operative to move the templet in the opposite direction to quickly withdraw the tool slide at the completion of the cutting operation.

3. In a lathe, the combination of a bed having ways extending longitudinally therealong, means on the bed for supporting and rotating a blank parallel with the ways, a tool carriage slidably mounted on the ways, a tool slide movable transversely on the carriage, means for moving the carriage longitudinally of the ways, means for holding the carriage against movement on the ways, a templet movable longitudinally relative to the carriage and connections for moving the tool slide inwardly when the carriage is stationary to operatively engage the work as the templet is moved in one direction, a rod operatively connected to the templet for so moving the same, and a spring on the rod for moving the templet in the opposite direction to quickly withdraw the tool slide at the completion of the cutting operation.

4. In a lathe, the combination of a bed having ways extending longitudinally therealong, means on the bed for supporting and rotating a blank parallel with the ways, a tool carriage slidably mounted on the ways, a tool slide movable transversely on the carriage, a templet and cooperating means for moving the tool slide inwardly to operatively engage the work as the templet is moved in one direction relative to the carriage, a rod connected to the templet, means for moving the rod and templet a predetermined amount in the said one direction, and means on the rod adapted to move the carriage through a portion only of such amount, the other portion of such movement being adapted to move the templet relative to the carriage.

5. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, a rod connected to the templet, means for reciprocating the rod, and means on the rod providing a lost motion connection with the carriage, the carriage thereby moving with the rod and templet through a portion only of their reciprocations.

6. In a lathe, the combination of a bed having ways extending longitudinally therealong, means on the bed for supporting and rotating a blank parallel with the ways, a tool carriage on the ways, a tool slide movable transversely on the carriage, adjustable stop means for limiting the movement of the carriage in the cutting direction, a templet and cooperating means for moving the tool slide inwardly to operatively engage the work as the templet is moved in the said cutting direction relative to the carriage, and means for moving the carriage and templet as a unit in the cutting direction until the carriage engages the stop, the last said means thereafter continuing the movement of the templet thereby moving the tool slide inwardly.

7. In a lathe, the combination of a bed having ways extending longitudinally therealong, means on the bed for supporting and rotating a blank parallel with the ways, a tool carriage on the ways, a tool slide movable transversely on the carriage, adjustable stop means for limiting the movement of the carriage in the cutting direction, a templet and cooperating means for moving the tool slide inwardly to operatively engage the work as the templet is moved in the said cutting direction relative to the carriage, means for moving the carriage and templet as a unit in the cutting direction until the carriage engages the stop, the last said means thereafter continuing the movement of the templet thereby moving the tool slide inwardly, and means operative on the templet in the opposite direction for quickly moving the tool slide outwardly away from the work at the completion of the cutting operation.

8. In a lathe, the combination of a bed having ways extending longitudinally therealong, means on the bed for supporting and rotating a blank parallel with the ways, a tool carriage on the ways, a tool slide movable transversely on the carriage, adjustable stop means for limiting the movement of the carriage in the cutting direction, a templet and cooperating means for moving the tool slide inwardly to operatively engage the work as the templet is moved in the said cutting direction relative to the carriage, spring means normally operative to move the templet in the opposite direction, and means for moving the carriage and templet as a unit in the cutting direction until the carriage engages the stop, the last said means thereafter continuing the movement of the templet against the action of the spring means and the latter thereafter reacting to move the templet in the opposite direction to quickly withdraw the tool slide away from the work at the completion of the cutting operation.

9. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, a rod operatively connected to the templet, a spring on the rod normally operative to move the templet in the opposite direction, and means operative on the rod to move the carriage and templet as a unit in the cutting direction until the carriage engages the stop, the last said means thereafter continuing the movement of the templet against the action of the spring and the spring thereafter reacting to move the templet in the opposite direction to quickly withdraw the tool slide from the work at the completion of the cutting operation.

10. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, a rod connected to the templet, means for moving the rod and templet a predetermined amount in the said one direction relative to the carriage, and means on the rod adapted to thereafter move the carriage with the templet.

11. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, a rod connected to the templet, means for moving the rod and templet a predetermined amount in said one direction, and a collar on the rod adapted to engage the carriage and move the same with the templet after the rod and templet have moved a predetermined amount relative to the carriage.

12. In a lathe, the combination of a bed having ways extending longitudinally therealong, means on the bed for supporting and rotating a blank parallel with the ways, a tool carriage on the ways, a tool slide movable transversely on the carriage, means providing a frictional connection between the carriage and bed, a templet and cooperating means for moving the tool slide inwardly to operatively engage the work as the templet is moved in one direction relative to the carriage, a rod connected to the templet, means for moving the rod and templet a predetermined amount in the said one direction relative to the carriage, and means on the rod adapted to thereafter move the carriage with the templet against the action of the said friction means.

In testimony whereof, I hereto affix my signature.

JOHN J. THACHER.